(12) United States Patent
Donsbach et al.

(10) Patent No.: US 9,196,151 B2
(45) Date of Patent: Nov. 24, 2015

(54) ENCODING LOCATION-BASED REMINDERS

(71) Applicant: Google Inc., Mountain View, CA (US)

(72) Inventors: Aaron Michael Donsbach, Seattle, WA (US); Evan Rapoport, Los Altos, CA (US)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 14/251,767

(22) Filed: Apr. 14, 2014

(65) Prior Publication Data
US 2015/0287316 A1 Oct. 8, 2015

Related U.S. Application Data

(60) Provisional application No. 61/975,037, filed on Apr. 4, 2014.

(51) Int. Cl.
G08B 21/00 (2006.01)
G08B 21/24 (2006.01)

(52) U.S. Cl.
CPC ...................................... *G08B 21/24* (2013.01)

(58) Field of Classification Search
CPC ....................................................... G08B 21/24
USPC ....................................................... 340/686.1
See application file for complete search history.

(56) References Cited

U.S. PATENT DOCUMENTS

| | | | |
|---|---|---|---|
| 7,920,878 B2 * | 4/2011 | Clipsham | 455/457 |
| 8,350,871 B2 | 1/2013 | Gyorfi et al. | |
| 8,385,944 B1 | 2/2013 | Nelissen | |
| 2004/0230685 A1 * | 11/2004 | Seligmann | 709/228 |
| 2010/0295676 A1 | 11/2010 | Khachaturov et al. | |
| 2012/0306659 A1 * | 12/2012 | Ben-Dayan et al. | 340/686.1 |

* cited by examiner

*Primary Examiner* — Kerri McNally
(74) *Attorney, Agent, or Firm* — Dorityt & Manning, P.A.

(57) ABSTRACT

Systems and methods for encoding location-based reminders are provided. Data indicative of a request for a location-based reminder can be received. The data indicative of the request can include data indicative of a user placement of a reminder in a visual representation of the geographic area, such as an image captured of the geographic area or a visual representation of the three-dimensional model of the geographic area. A selected location within a three-dimensional model of a geographic area can be identified based on the data indicative of the user placement of the reminder. Three-dimensional geographic coordinates corresponding to the selected location can be determined using the three-dimensional model and associated with the location-based reminder. The location-based reminder can then be triggered based at least in part on signals indicative of user position and/or orientation in the geographic area.

20 Claims, 6 Drawing Sheets

ENCODING LOCATION-BASED REMINDERS

PRIORITY CLAIMS

The present application is based upon and claims priority to U.S. Provisional Patent Application Ser. No. 61/975,037, entitled "Encoding Location-Based Reminders" and filed on Apr. 4, 2014, which is hereby incorporated herein by reference in its entirety for all purposes.

FIELD

The present disclosure relates generally to location-based reminders, and more particularly to encoding location-based reminders using a three-dimensional model of a geographic area.

BACKGROUND

Remembering to perform certain tasks can be difficult for certain individuals. The use of reminder systems and task lists can be used to assist users with reminding the users to perform certain tasks. Remembering to perform certain tasks may only matter when an individual is at a certain location. Location-based reminders or task-lists can be used to remind users to perform certain tasks when the user approaches specified locations. Location-based reminders typically operate by encoding reminders with geographic coordinates, such as latitude and longitude coordinates. The reminders can be triggered when the user approaches the geographic coordinates associated with the reminder.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of encoding a location-based reminder. The method includes receiving, by one or more computing devices, data indicative of a request for a location-based reminder. The one or more computing devices can include one or more processors. The data indicative of the request includes data indicative of a user placement of a reminder in a visual representation of a geographic area. The method further includes accessing, by the one or more computing devices, a three-dimensional model of the geographic area. The three-dimensional model includes data indicative of three-dimensional geographic coordinates in the geographic area corresponding to one or more locations in the three-dimensional model. The method further includes identifying, by the one or more computing devices, a selected location within the three-dimensional model based at least in part on the data indicative of the user placement of the reminder and determining, by the one or more computing devices geospatial data corresponding to the selected location in the three-dimensional model. The method further includes associating, by the one or more computing devices, the location-based reminder with the geospatial data corresponding to the selected location in the three-dimensional model. The location-based reminder is triggered based at least in part on one or more signals indicative of user position in the geographic area.

Other example aspects of the present disclosure are directed to systems, apparatus, tangible, non-transitory computer-readable media, user interfaces, memory devices, and electronic devices for encoding location-based reminders.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
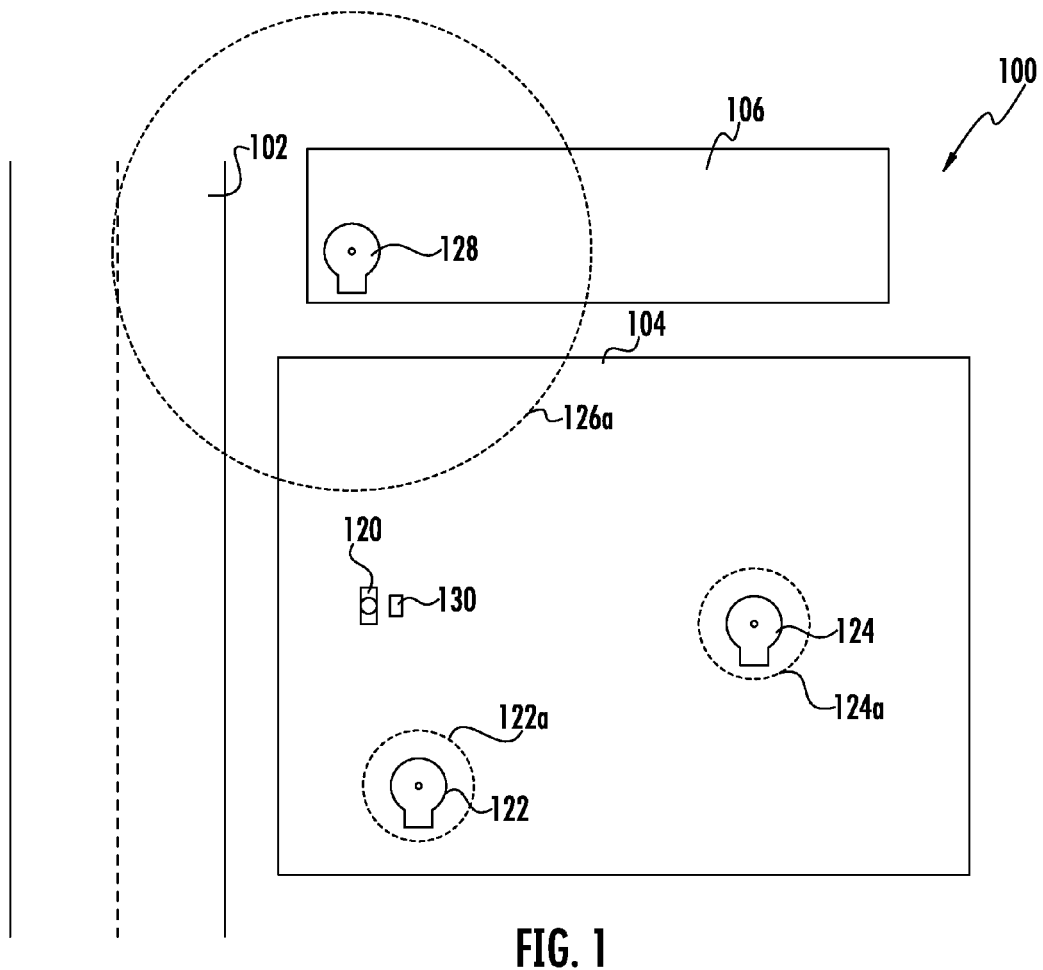
FIG. 1 depicts a plurality of location-based reminders encoded according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to encoding location-based reminders. Location-based reminders or task lists can be used to assist users in remembering to perform certain tasks. A location-based reminder can be triggered when a user approaches a location associated with the location-based reminder. For example, a user's smartphone, wearable computing device, or other device can provide the reminder "Water The Plants" when a positioning system associated with the smartphone or other device provides one or more signals indicative of the user arriving at home.

Existing location-based reminder systems can suffer several drawbacks. For example, it can be difficult and/or tedious to precisely encode location-based reminders with geographic coordinates for triggering the reminder. In addition, typical location-based reminder systems encode reminders with two-dimensional geographic coordinates (e.g. latitude and longitude coordinates). This can cause the user to get quickly overwhelmed if multiple reminders are tied to the same general location. For example, if a plurality of reminders are encoded with general latitude and longitude coordinates associated with a grocery store, the user can be inundated with all of the reminders associated with the grocery store as soon as the user approaches the grocery store.

Example aspects of the present disclosure are directed to systems and methods for easily encoding location-based reminders with more specific geographic locations to provide more narrowly focused location-based reminders. For instance, a location-based reminder can be encoded with coordinates associated with a specific aisle in a grocery store, as opposed to coordinates associated with the entire grocery store generally. The enhanced precision of encoding location-based reminders according to example aspects of the present disclosure can be achieved by encoding the reminders using a three-dimensional model of a geographic area, such as a three-dimensional model associated with an interactive panorama application or a virtual globe application. The three-dimensional model of the geographic area can include data indicative of three-dimensional geographic coordinates in the geographic area corresponding to one or more locations in the three-dimensional model.

More particularly, data indicative of a request for a location-based reminder can be received. The data indicative of the request can include data indicative of a user placement of a reminder in a visual representation of the geographic area. For instance, a user can access a visual representation of the geographic area. The visual representation can be an image captured of the geographic area, such as a user generated image or an image of the geographic area available, for instance, as part of online content. The visual representation can also include a visual representation of the three-dimensional model of the geographic provided by, for instance, a geographic information system. For instance, the visual representation can be an interactive panorama or other visual representation provided by a geographic information system. The user placement of the reminder can be achieved by a user interaction with the visual representation of the geographic area. For instance, the user can tap, click, or otherwise select a particular location on the visual representation of the geographic area to place a reminder at the location selected by the user.

Once the request is received, a selected location within a three-dimensional model of a geographic area can be identified based on the data indicative of the user placement of the reminder. Three-dimensional geographic coordinates and other geospatial data corresponding to the selected location can be determined using the three-dimensional model and associated with the location-based reminder. The location-based reminder can then be triggered based at least in part on signals indicative of user position and/or orientation in the geographic area relative to the three-dimensional geographic coordinates.

For instance, in one particular implementation, a user can encode a location-based reminder with a precise geographic location by accessing a visual representation of the three-dimensional model of the geographic area displayed on a display device, such as an interactive panorama or other three-dimensional representation of the geographic area. The user can interact with the visual representation of the interactive panorama or other three-dimensional representation of the geographic area at a selected location within the visual representation using a suitable user interaction (e.g. clicking, tapping, or otherwise selecting a location within the visual representation of the three-dimensional model). Geospatial data associated with the selected location can be extracted from the three-dimensional model. For instance, three-dimensional geographic coordinates and/or virtual camera position/orientation information can be extracted from the three-dimensional model. The geospatial data can be associated with the location-based reminder to encode the location-based reminder.

In another example implementation, a user can access an image of a geographic area captured using a suitable image capture device (e.g. a camera). The image can be a user generated image or another image accessible by a user on a computing device (e.g. an image available online). Position and orientation information associated with the image can be determined or accessed. A three-dimensional model corresponding to the geographic area depicted in the image can be accessed, for instance, in a geographic information system, based at least in part on the position and orientation information. The selected location within the three-dimensional model can be identified and geospatial data can be extracted for the selected location from the three-dimensional model. The geospatial data can then be associated with a location-based reminder to encode the location-based reminder so that the location-based reminder is triggered when a user approaches the scene depicted in the image.

Location-based reminders encoded according to example aspects of the present disclosure can be triggered based on signals indicative of user position and/or orientation in the geographic area. For instance, a location-based reminder can be triggered when a positioning system provides a signal indicative of a user being within a threshold distance of the three-dimensional geographic coordinates associated with the location-based reminder. In other implementations, the location-based reminder can be triggered based on signals indicative of a user facing or being oriented towards the geographic location associated with the location-based reminder information using, for instance camera perspective or orientation information associated with the location-based reminder.

Various embodiments discussed herein may access and analyze personal information about users, or make use of personal information, such as user position or orientation information. In situations in which the systems and methods discussed herein access and analyze information about users, or make use of such information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how such information is collected and used by the application or system. In addition, certain information or data can be treated in one or more ways before it is stored or used, so that personally identifiable information is removed. For example, a user's identity may be treated so that no personally identifiable information can be determined for the user.

Example Location-Based Reminders

FIG. 1 depicts a conceptual diagram of a plurality of location-based reminders encoded according to example aspects of the present disclosure. More particularly, FIG. 1 represents a portion of a geographic area 100 that includes various elements, such as a road 102, a buildings 104 106. The buildings 104 and 106 can be associated with various entities or businesses. For instance, building 104 can be associated with a grocery or other business. A user 120 may need to perform certain tasks when located in the geographic area 100. Remembering to perform these tasks can sometimes be difficult.

According to aspects of the present disclosure, a user 120 can create a plurality of location-based reminders using a reminder application or other personal assistant application to remind the user to perform certain tasks when the user approaches selected locations within the geographic area 100. The location-based reminders can be provided to the user 120 via a user device 130, such as a smartphone, tablet, mobile device, wearable computing device, a display with one or more processors or other suitable device.

For example, a user can create a first location-based reminder 122, a second location-based reminder 124, and a third location-based reminder 126. Each of the first location-based reminder 122, the second location-based reminder, and the third location-based reminder 126 can be associated with a different task. For example, the first location-based reminder 122 can remind the user to pick up cereal. The second location-based reminder 124 can remind the user to pick up a prescription. The third location-based reminder 126 can remind the user to pick up dry cleaning.

The location-based reminders 122, 124, and 126 can be triggered based on one or more signals indicative of user position and/or orientation in the geographic area 100. For instance, a user device 130 carried by the user 120 can include one or more sensors and/or a positioning system configured to provide signals indicative of user position and/or orientation in the geographic area 100. When the one or more signals indicate that the user 120 is located proximate to and/or is oriented towards a geographic location associated with one of the location based-reminders 122, 124, or 126, the particular location-based reminder can be triggered to remind the user to perform a task.

Figure 2:
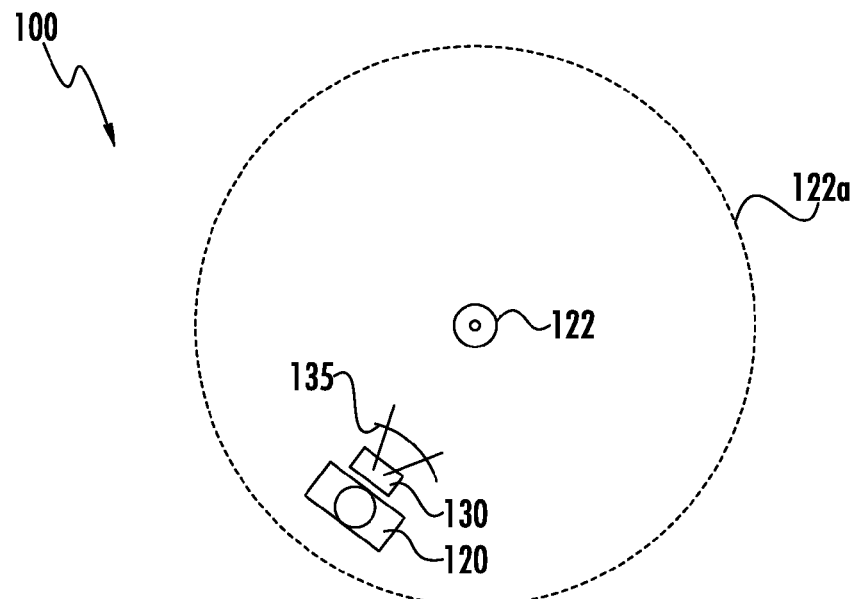
FIG. 2 depicts the triggering of an example location-based reminder according to example embodiments of the present disclosure.

FIG. 2 depicts an example of a location-based reminder being triggered based at least in part on one or more signals indicative of user position and/or orientation in the geographic area 100. More particularly, a user 120 carrying a user device 130 has approached a geographic location associated with location-based reminder 122. The location-based reminder 122 can be triggered when the user device 130 provides a signal (e.g. using satellite positioning and/or proximity-based detection methods like low-power beacons, WiFi access points, and the like) indicative of the user device being positioned within a trigger zone 122a associated with the location-based reminder.

In addition and/or in the alternative, the location-based reminder 122 can be triggered based on one or more signals indicative of user orientation in the geographic area 100. More particularly, various sensors (e.g. accelerometers, image capture devices, depth sensors, gyroscopes, etc.) associated with the user device 130 can provide signals indicative of camera perspective 135 of the user device 130. If the camera perspective 135 of the user device 130 views the location-based reminder 122, the location-based reminder 122 can be triggered. For instance, as will be discussed in detail below, the location-based reminder 122 can be encoded with geospatial data indicative of virtual camera perspective information. If the camera perspective 135 of the user device 130 is within a threshold of the virtual camera perspective associated with the location-based reminder 122, the location-based reminder 122 can be triggered. In this way, location-based reminders can be triggered when a user is viewing a particular geographic area (e.g. the cereal aisle in a grocery store).

Figure 3:
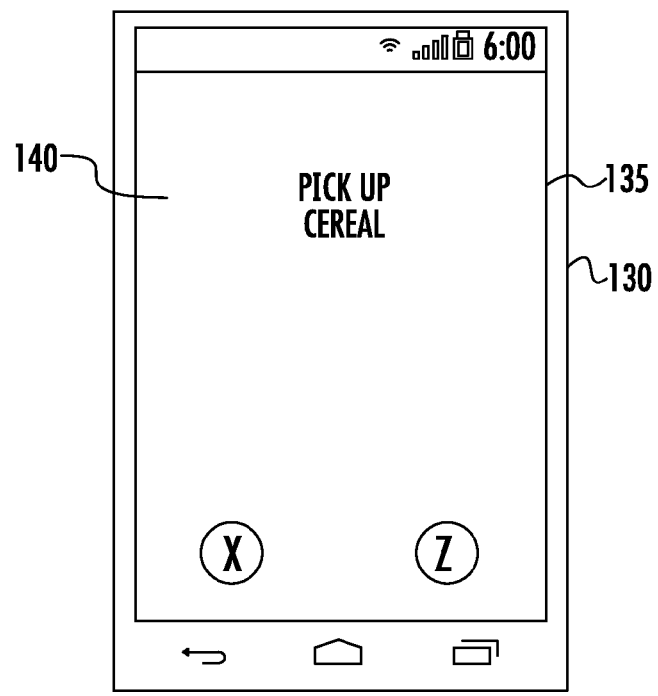
FIG. 3 depicts an example graphical user interface associated with a location-based reminder according to example embodiments of the present disclosure.

FIG. 3 depicts an example graphical user interface 140 associated with a location-based reminder that can be presented on a display device 135 of the user device 130. As shown, a reminder can be presented on the display device 135 to remind the user to perform a certain task. In the example of FIG. 3, the reminder alerts the user to "Pick Up Cereal." Other suitable alerts or reminders, such as audible alerts, visual alerts, vibratory alerts can also be provided to the user via, for instance, the user device 130 when a location-based reminder is triggered.

According to example aspects of the present disclosure, the location-based reminders 122, 124, and 126 (FIG. 1) can be encoded with enhanced precision to provide more focused location-based reminders. For example, each location-based reminder can be associated with a trigger zone having a size dependent on the nature of the task associated with the reminder and can be customizable by the user 120. In one example implementation, more specific tasks can be associated with smaller trigger zones while more general tasks can be associated with larger trigger zones.

For instance, location based-reminder 126 associated with the general task of picking up dry cleaning can have a larger trigger zone 126a such that the location-based reminder is triggered when the user generally approaches the dry cleaning facility. Location-based reminders 122 and 124 can be associated with more specific tasks, such as picking up cereal and picking up a prescription. The location-based reminders 122 and 124 can have smaller trigger zones 122a and 124a such that the reminders are triggered when the user 120 is closer to the geographic location associated with the location-based reminder. For instance, the trigger zones 122a and 124a can be associated with a specific aisle or location in a building 104 as opposed to the building 104 generally. In this way, the user 120 can avoid being inundated with all location-based reminders associated with the general location when the user approaches the general location.

According to example aspects of the present disclosure, the location-based reminders can be encoded with geospatial data using a three-dimensional model to facilitate more precise placement and focused triggering of the location-based reminders. More particularly, the location-based reminders can be encoded with geospatial data determined from a three-dimensional model of the geographic area 100. The three-dimensional model can provide a virtual three-dimensional representation of the geographic area 100 and can include a level of detail and/or resolution down to ground level perspectives (i.e. perspectives of a user from a ground level). The increased resolution of the three-dimensional model can be used to encode location-based reminders with enhanced precision.

Figure 4:
FIG. 4 depicts an example visual representation of a geographic area used to encode a location-based reminder according to example embodiments of the present disclosure.

The location-based reminders can be encoded using the three-dimensional model based at least in part on data indicative of a user placement of a reminder in a visual representation of a geographic area presented on a display device, such as a display device associated with the user device 130 or other computing device. For example, FIG. 4 depicts an example visual representation 200 of a geographic area presented on a display device 210. The example visual representation 200 is an interactive panorama of the geographic area. The visual representation 200 can include other representations of the geographic area, such as a texture mapped three-dimensional model of a geographic area presented by a geographic information system or an image captured by a camera depicting the geographic area. A user can interact with the visual representation 200 to "place" a reminder in the geographic area. For instance, a user can interact with the visual representation 200 at user placement 220 to place a reminder in the geographic area. The user interaction can include tapping, clicking, or otherwise selecting the visual representation 200 at user placement 220.

The user placement 220 of the reminder in the visual representation 200 can be correlated with a selected location in a three-dimensional model corresponding to the geographic area depicted in the visual representation 200. For instance, in example embodiments, the visual representation 200 is a visual representation of the three-dimensional model (e.g. an interactive panorama, virtual globe, etc.). In these embodiments, the selected location can be determined directly from the user placement 220 relative to the visual representation of the three-dimensional model.

In other embodiments, the visual representation 200 can be an image of the geographic area captured by a camera that has been accessed by the user. For instance, the image can be an image captured by the user or accessed by the user through various online resources. The image can include data indicative position and orientation information (e.g. pose). The position and orientation information can be used to access a three-dimensional model corresponding to the geographic area depicted in the image. The selected location can then be identified based on the user placement of the reminder in the image of the geographic area.

Figure 5:
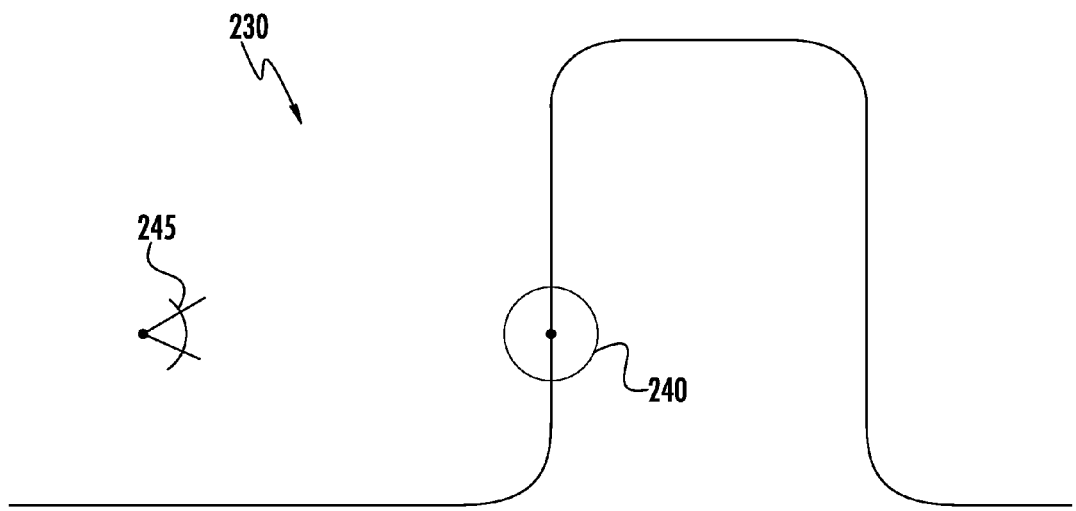
FIG. 5 depicts example geospatial data associated with a selected location extracted from an example three-dimensional model according to example embodiments of the present disclosure.

FIG. 5 depicts an example three-dimensional model 230 corresponding to the geographic area depicted in the visual representation 200 of FIG. 4. FIG. 5 illustrates two-dimensional elements for purposes illustration and discussion. One of ordinary skill in the art, using the disclosures provided herein, will recognize that the two-dimensional elements can be representative of three-dimensional elements. The three-dimensional model 230 can include geometry data (e.g. a polygon mesh) modeling the terrain and/or buildings in the geographic area as well as geographic imagery (e.g. satellite images, aerial images, panoramic images) texture mapped to the geometry data. The three-dimensional model can also include three-dimensional geographic coordinates (e.g. latitude, longitude, and altitude) corresponding to one or more locations in the three-dimensional model 230.

A selected location 240 can be determined based at least in part on the data indicative of the user placement of the reminder in the visual representation of the geographic area. Geospatial data associated with the selected location 240 can be extracted from the three-dimensional model 230. The geospatial data can include three-dimensional geographic coordinates corresponding to the selected location 240 in the three-dimensional model 230. In addition and/or in the alternative, the geospatial data can include data associated with a virtual camera perspective 245 of the three-dimensional model. The data indicative of the virtual camera perspective 245 can provide camera position and orientation information associated with a particular view of the three-dimensional model 230. For example, the data indicative of the virtual camera perspective 245 can provide camera position and orientation information associated with the visual representation 200 (FIG. 4) of the geographic area. The location-based reminder can be encoded with the geospatial data such that the location-based reminder is triggered based on one or more signals indicative of user position and orientation as discussed above.

Example System for Encoding Location-Based Reminders

Figure 6:
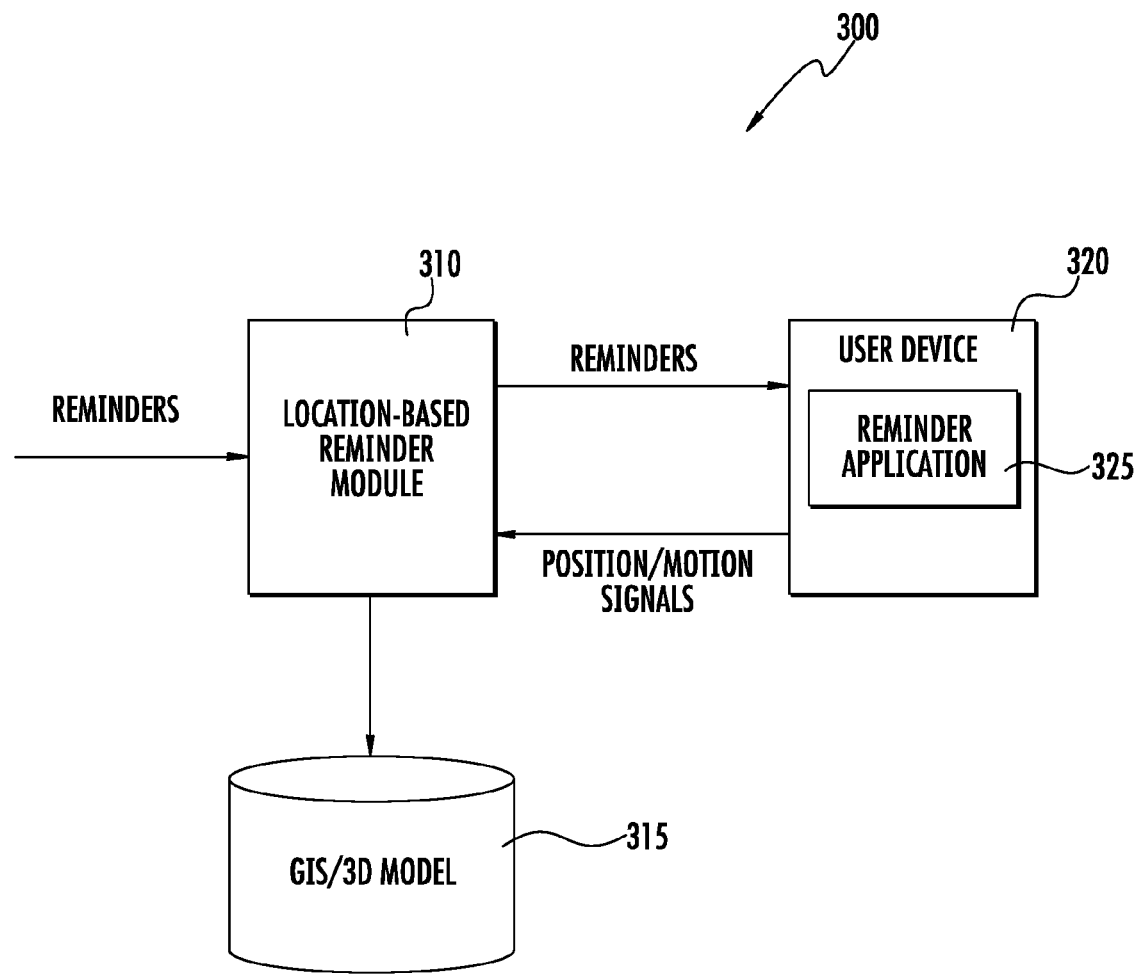
FIG. 6 depicts an example system for encoding location-based reminders according to example embodiments of the present disclosure.

FIG. 6 depicts an overview of an example location-based reminder system 300 according to example aspects of the present disclosure. The system 300 can be implemented using one or more computing devices, such as one or more of the computing devices depicted in FIG. 8. The system 300 can include a location-based reminder module 310 configured to implement one or more aspects of the present disclosure, such as encoding location-based reminders using a three-dimensional model 315. The location-based reminder module 310 can interface with a reminder application 325 implemented on a user device 320 to provide location-based reminders to the user.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, hard disk or optical or magnetic media. When software is used, any suitable programming language or platform can be used to implement the module.

According to example aspects of the present disclosure, the location-based reminder module 310 can be configured to receive data indicative of the requests for location-based reminders. The data indicative of requests can be received from the reminder application 325 implemented on the user device 320. Alternatively, the data indicative of the requests can be received from other applications (e.g. interactive panorama applications, virtual globe applications, etc.) implemented on other computing devices.

The data indicative of the request can include information for generating the location-based reminder. For instance, the data indicative of the request can include information associated with a task to be associated with the location-based reminder. The data indicative of the request can also include data sufficient to identify a selected location within a three-dimensional model, such as a three-dimensional model 315 provided as part of a geographic information system, for encoding the location-based reminder. For instance, the request can include data indicative of a user placement of a reminder in a visual representation of the geographic area.

As illustrated in FIG. 6, the location-based reminder module 310 can access a three-dimensional model 315 of a geographic area provided as part of a geographic information system (GIS). The geographic information system can provide for the archiving, retrieving, and manipulation of geographic data that has been indexed and stored according to geographic coordinates, such as latitude, longitude, and altitude coordinates, associated with the geographic data. The system can combine satellite imagery, photographs, maps, geometry data, interactive panoramas and other geographic data, and Internet search capability so as to enable a user to view imagery of a geographic area and related geographic information (e.g., locales such as islands and cities; and points of interest such as local restaurants, hospitals, parks, hotels, and schools).

The geographic information system can include a three-dimensional model 315 of the geographic area. The three-dimensional model 315 can include data sufficient to act as a virtual representation of the geographic area. The three-dimensional model 315 of the geographic area can include data indicative of three-dimensional geographic coordinates corresponding to locations within the three-dimensional model 315. For instance, each location in the three-dimensional model 315 can be associated with three-dimensional geographic coordinates (e.g. latitude, longitude, and altitude coordinates) corresponding to the geographic location modeled at the particular location in the three-dimensional model.

In certain implementations, the geographic information system can allow a user to view and navigate a visual representation of the three-dimensional model of the geographic area. For instance, the geographic information system can provide a visual representation of the three-dimensional model of the geographic area that includes textures mapped to geometry modeling the terrain and/or buildings in the geographic area. More specifically, the three-dimensional model can include geometry data, such as a polygon mesh, that models the three-dimensional terrain and/or buildings in a geographic area. Geographic imagery, such as satellite and/or aerial imagery, can be texture mapped to the geometry to provide a realistic visual representation of the geographic area.

The visual representation of the three-dimensional model can also include interactive panoramas of the geographic area. Interactive panoramas can depict objects such as buildings, building interiors, trees, monuments, etc. from a perspective of a few feet above the ground. The interactive panoramas can be used to provide an immersive 360° panoramic viewing experience to a user centered around a geographic area of interest. The panoramic images can be created by stitching together the plurality of photographs taken from the different angles. The panoramic images can be constructed from images captured by a camera of the geographic area and can depict outside environments and/or interior environments (e.g. the interior of a business or public space). In particular implementations, the panoramic images can be presented as a texture-mapped three dimensional surface.

For example, in one particular implementation, the location-based reminder module 210 can identify the selected location within the three-dimensional model based on a user interaction with a visual representation of the three-dimensional model, such as a user interaction with an interactive panorama. More particularly, a user can access a visual representation of the three-dimensional model via a user interface associated a geographic information system. The user can interact with the visual representation to select a location within the three-dimensional model by clicking, tapping, or otherwise selecting the location in the visual representation. Data indicative of the user interaction can be provided to the location-based reminder module 210 as part of the request.

In another implementation, the location-based reminder module 210 can identify the selected location within the three-dimensional model based on a user interaction with an image depicting the geographic area. The image can be a user generated image or other image captured of the geographic area. The user can access the image and can place a reminder at a location depicted in the image using a suitable user interaction. Data indicative of the user interaction can be provided to the location-based reminder module 210 as part of the request. The location-based reminder module can access a three-dimensional model corresponding to the geographic area depicted in the image based on position and orientation information associated with the image. The selected location in the three-dimensional model can then be determined based on the user placement of the reminder relative to the image.

Once the selected location in the three-dimensional model is identified, the location-based reminder module 210 can extract geospatial data associated with the selected location and encode the location-based reminder with the geospatial data. The location-based reminder module 210 can then provide reminders to the user device 230 when one or more signals indicative of user position and/or orientation indicate that the user device 230 is in proximity to or oriented towards the geographic location associated with the location-based reminder.

Example Methods for Encoding Location-Based Reminders

Figure 7:
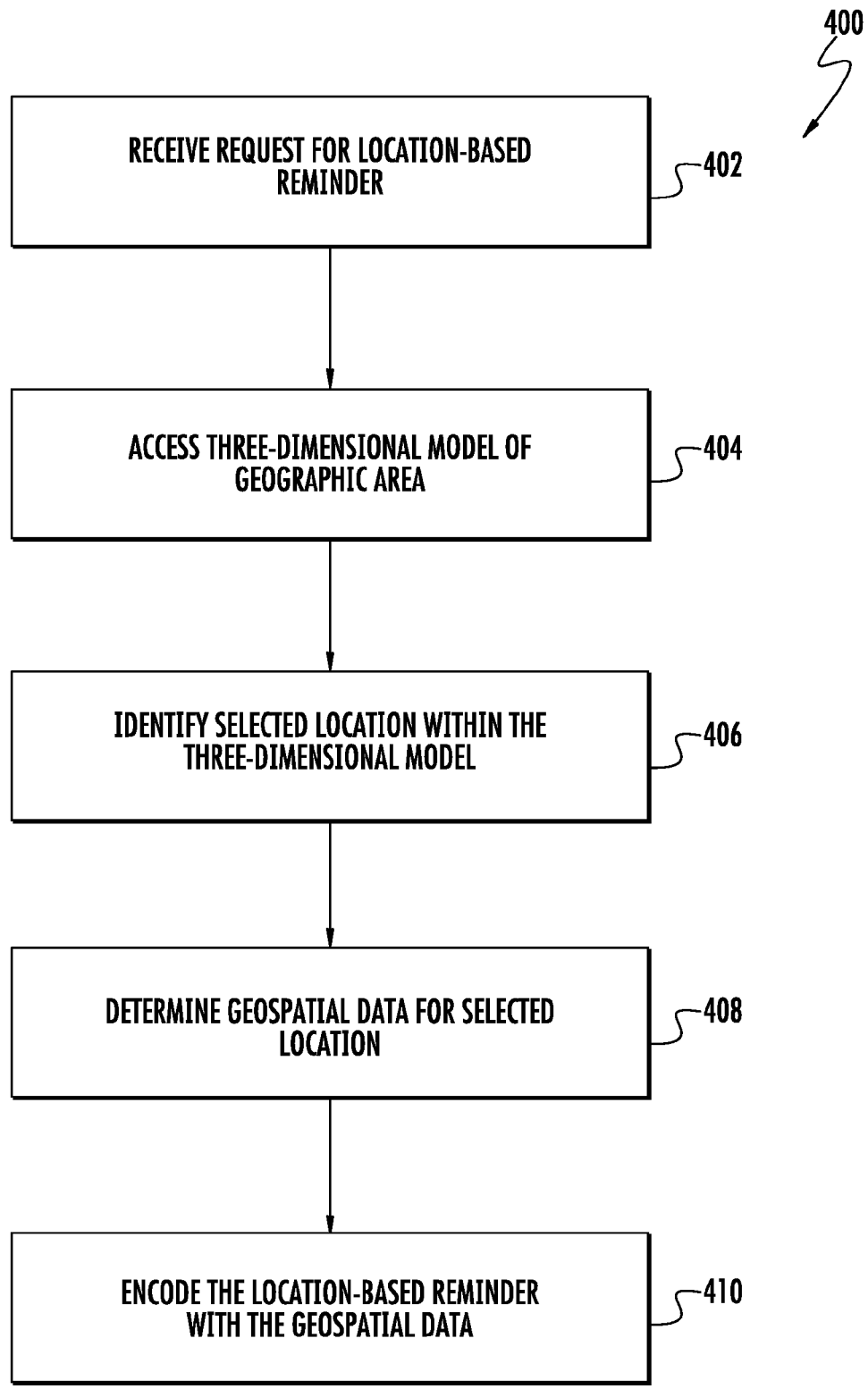
FIG. 7 depicts an example method for encoding location-based reminders according to example embodiments of the present disclosure.

FIG. 7 depicts a process flow diagram of an example method (400) for encoding location-based reminders according to example aspects of the present disclosure. The method (400) can be implemented by one or more computing devices, such as one or more of the computing devices depicted in FIG. 8. In addition, FIG. 7 depicts steps performed in a particular order for purposes of illustration and discussion. Those of ordinary skill in the art, using the disclosures provided herein, will understand that the various steps of any of the methods or processes disclosed herein can be expanded, omitted, rearranged or modified in various ways without deviating from the scope of the present disclosure.

At (402), the method includes receiving data indicative of a request for a location-based reminder. The data indicative of the request can include information for encoding a location-based reminder with geospatial data, such as three-dimensional geographic coordinates. For instance, the data indicative of the request for the location-based reminder can include data sufficient to identify a selected location in a three-dimensional model of a geographic area.

The data sufficient to identify the selected location in the three-dimensional model can include data indicative of a user placement of a reminder in a visual representation of the geographic area, such as an image of the geographic area or a visual representation of a three-dimensional model of the geographic area (e.g. an interactive panorama). The user placement can be accomplished by a user interaction with the visual representation of the geographic area. For instance, a user can click, tap, or select a location in the visual representation of the geographic area to place the reminder in the visual representation of the geographic area.

At (404), the three-dimensional model of the geographic area can be accessed. In embodiments, where the visual representation includes a visual representation of a three-dimensional model, the three-dimensional model depicted in the visual representation can be accessed. In implementations where the visual representation is an image captured of the geographic area, the method can include determining position and orientation information associated with the image. The position and orientation information can be determined from metadata associated with the image or by posing the image using image analysis techniques (e.g. feature matching techniques). The three-dimensional model corresponding to the geographic area depicted in the image can be accessed based on the position and orientation information associated with the image.

At (406), the selected location within the three-dimensional model can be identified based on the data indicative of the user placement of the reminder. More particularly, the location in the three-dimensional model that corresponds to the user placement of the reminder in the visual representation of the geographic area can be identified as the selected location.

Once the selected location has been identified, the method can determine geospatial data for the selected location using the three-dimensional model (408). More specifically, the three-dimensional model can include three-dimensional geographic coordinates for one or more locations in the three-dimensional model. The three-dimensional geographic coordinates can be extracted as the geospatial data. In addition and/or in the alternative, virtual camera perspective information can be extracted from the three-dimensional model. For instance, virtual camera perspective information associated with the visual representation of the three-dimensional model accessed by a user to place the reminder can be extracted as geospatial data. The location-based reminder can be encoded with the extracted geospatial data (410).

Example Computing Systems for Encoding Location-Based Reminders

Figure 8:
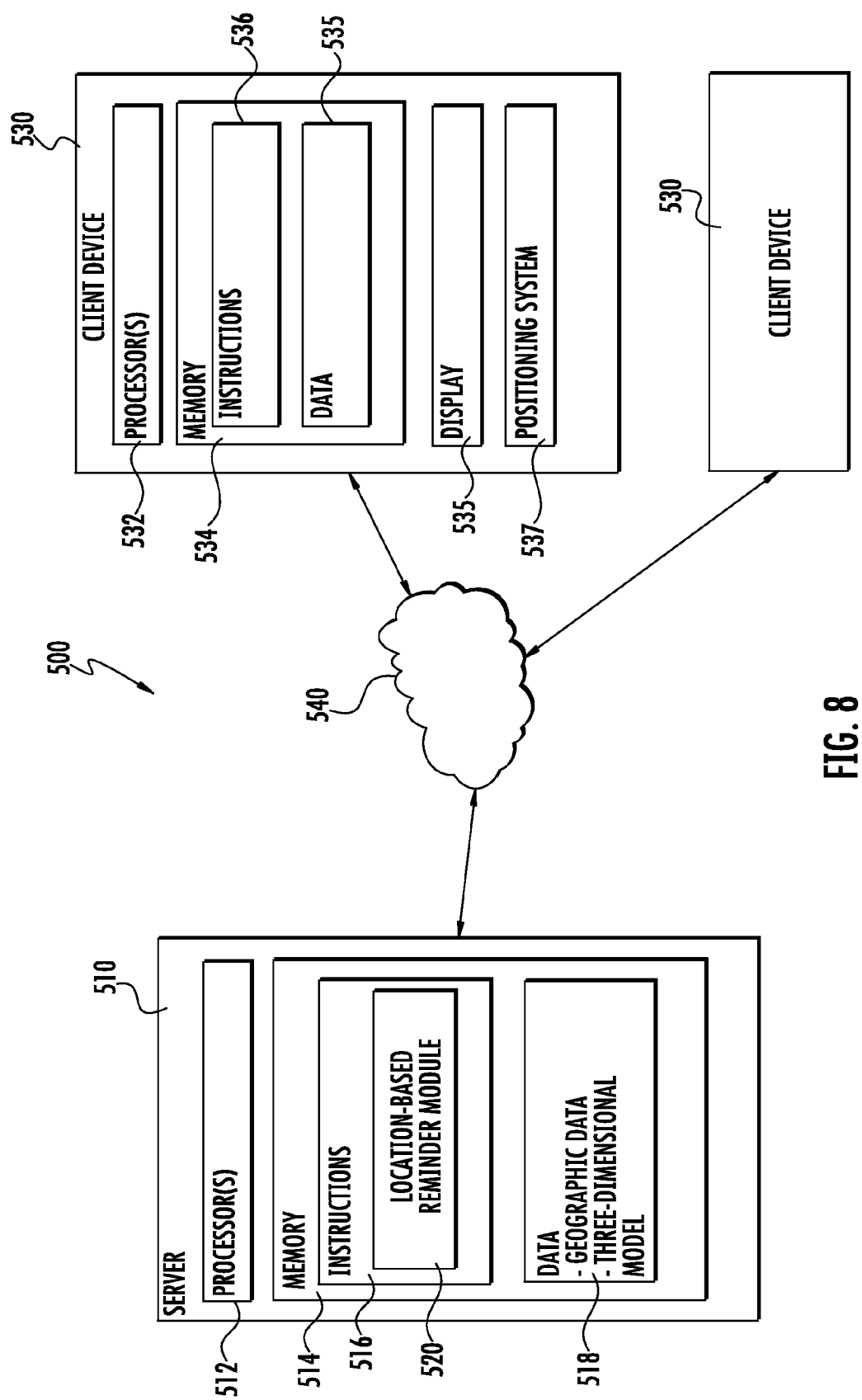
FIG. 8 depicts an example computing system for encoding location-based reminders according to example embodiments of the present disclosure.

FIG. 8 depicts a computing system 500 that can be used to implement the methods and systems for encoding location-based reminders according to example aspects of the present disclosure. The system 500 can be implemented using a client-server architecture that includes a server 510 that communicates with one or more client devices 530 over a network 540. The system 500 can be implemented using other suitable architectures, such as a single computing device.

The system 500 includes a server 510, such as a web server. The server 510 can host a geographic information system and/or a location-based reminder platform. The server 510 can be implemented using any suitable computing device(s). The server 510 can have one or more processors 512 and memory 514. The server 510 can also include a network interface used to communicate with one or more client devices 530 over the network 540. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, or other suitable processing device. The memory 514 can include one or more computer-readable media, including, but not limited to, non-transitory computer-readable media, RAM, ROM, hard drives, flash drives, or other memory devices. The memory 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to implement one or more modules, such as a location-based reminder module 520.

Memory 514 can also include data 518 that can be retrieved, manipulated, created, or stored by the one or more processors 512. The data 518 can include, for instance, geographic data stored in a geographic information system and a three-dimensional model of a geographic area. The data 518 can be stored in one or more databases. The one or more databases can be connected to the server 510 by a high bandwidth LAN or WAN, or can also be connected to server 510 through network 540. The one or more databases can be split up so that they are located in multiple locales.

The server 510 can exchange data with one or more client devices 530 over the network 540. Although two client devices 530 are illustrated in FIG. 8, any number of client devices 530 can be connected to the server 510 over the network 540. Each of the client devices 530 can be any suitable type of computing device, such as a general purpose computer, special purpose computer, laptop, desktop, mobile device, smartphone, tablet, wearable computing device, a display with one or more processors, or other suitable computing device.

Similar to the server 510, a client device 530 can include one or more processor(s) 532 and a memory 534. The one or more processor(s) 532 can include one or more central processing units (CPUs), graphics processing units (GPUs) dedicated to efficiently rendering images or performing other specialized calculations, and/or other processing devices. The memory 534 can include one or more computer-readable media and can store information accessible by the one or more processors 532, including instructions 536 that can be executed by the one or more processors 532 and data 538. For instance, the memory 534 can store instructions 536 for implementing a reminder application that interfaces with the location-based reminder module 520 to create and provide location-based reminders to a user.

The client device 530 of FIG. 8 can include various input/output devices for providing and receiving information from a user, such as a touch screen, touch pad, data entry keys, speakers, and/or a microphone suitable for voice recognition. For instance, the client device 530 can have a display 535 for presenting geographic imagery of a geographic area to a user and for presenting location-based reminders to a user.

The client device 530 can further include a positioning system 537. The positioning system 537 can include one or more devices or circuitry for determining the position of a client device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, low-power beacons, and the like and/or other suitable techniques for determining position. The client device 530 can include one or more motion sensors, depth sensors and image capture devices. Signals, images, and information generated by the sensors and devices can to generate one or more signals of indicative of position and orientation in a geographic area.

The client device 530 can also include a network interface used to communicate with one or more remote computing devices (e.g. server 510) over the network 540. The network interface can include any suitable components for interfacing with one more networks, including for example, transmitters, receivers, ports, controllers, antennas, or other suitable components.

The network 540 can be any type of communications network, such as a local area network (e.g. intranet), wide area network (e.g. Internet), cellular network, or some combination thereof. The network 540 can also include a direct connection between a client device 530 and the server 510. In general, communication between the server 510 and a client device 530 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of encoding a location-based reminder, the method comprising:
   receiving, by one or more computing devices, data indicative of a request for a location-based reminder, the one or more computing devices comprise one or more processors, the data indicative of the request including data indicative of a user placement of a reminder in a visual representation of a geographic area;
   accessing, by the one or more computing devices, a three-dimensional model of the geographic area, the three-dimensional model comprising data indicative of three-dimensional geographic coordinates in the geographic area corresponding to one or more locations in the three-dimensional model;
   identifying, by the one or more computing devices, a selected location within the three-dimensional model based at least in part on the data indicative of the user placement of the reminder;
   determining, by the one or more computing devices, geospatial data corresponding to the selected location in the three-dimensional model; and
   associating, by the one or more computing devices, the location-based reminder with the geospatial data corresponding to the selected location in the three-dimensional model;
   wherein the location-based reminder is triggered based at least in part on one or more signals indicative of user position in the geographic area.

2. The computer-implemented method of claim 1, wherein the data indicative of the user placement of the reminder comprises data indicative of a user interaction with the visual representation of the geographic area presented on a display device.

3. The computer-implemented method of claim 2, wherein data indicative of the user interaction comprises data indicative of the user tapping, clicking, or selecting a location on the visual representation of the geographic area.

4. The computer-implemented method of claim 1, wherein the visual representation of the geographic area comprises a visual representation of the three-dimensional model provided by a geographic information system.

5. The computer-implemented method of claim 4, wherein the visual representation of the three-dimensional model comprises an interactive panorama.

6. The computer-implemented method of claim 4, wherein the visual representation of the three-dimensional model comprises geographic imagery texture mapped to a polygon mesh modeling the geometry of the geographic area.

7. The computer-implemented method of claim 1, wherein the visual representation of the geographic area comprises an image captured of the geographic area.

8. The computer-implemented method claim 7, wherein accessing, by the one or more computing devices, a three-dimensional model of the geographic area comprises:
   determining, by the one or more computing devices, position and orientation information associated with the image captured of the geographic area; and
   accessing, by the one or more computing devices, the three-dimensional model modeling the geographic area depicted by the image based at least in part on the position and orientation information.

9. The computer-implemented method of claim 1, wherein the geospatial data comprises three-dimensional geographic coordinates associated with the selected location.

10. The computer-implemented method of claim 1, wherein the geospatial data comprises virtual camera perspective information associated with the selected location.

11. The computer-implemented method of claim 10, wherein the location-based reminder is triggered based at least in part on one or more signals indicative of user orientation in the geographic area.

12. The computer-implemented method of claim 11, wherein the location-based reminder is triggered based at least in part on the one or more signals indicative of user orientation and the virtual camera perspective information associated with the selected location.

13. A computing system, comprising:
   a display device;
   one or more processors; and
   one or more memory devices, the memory devices storing computer-readable instructions that when executed by the one or more processors cause the one or more processors to perform operations, the operations comprising:
   determining a selected location in a three-dimensional model corresponding to a user placement of a reminder in a visual representation of a three-dimensional model of a geographic area presented on the display device;
   obtaining geospatial data corresponding to the selected location in the three-dimensional model;
   encoding a location-based reminder with the geospatial data corresponding to the selected location in the three-dimensional model; and
   triggering the location based reminder based at least in part on one or more signals indicative of user position in the geographic area.

14. The computing system of claim 13, wherein the user placement of the reminder comprises a user interaction with the visual representation of the three-dimensional model presented on the display device.

15. The computing system of claim 13, wherein the visual representation comprises an interactive panorama of the geographic area, the interactive panorama comprising geospatial data associated with one or more locations depicted in the interactive panorama.

16. The computing system of claim 13, wherein the visual representation comprises geographic imagery texture mapped to a polygon mesh modeling the geometry of the geographic area.

17. The computing system of claim 13, wherein the geospatial data comprises three-dimensional geographic coordinates corresponding to the selected location.

18. One or more tangible, non-transitory computer-readable media storing computer-readable instructions that when executed by one or more processors cause the one or more processors to perform operations for encoding a location-based reminder, the operations comprising:

determining a selected location within a three-dimensional model based on data indicative of a user placement of a reminder with a visual representation of a geographic area, the three-dimensional model providing a virtual representation of the geographic area and comprising data indicative of three-dimensional geographic coordinates in the geographic area corresponding to one or more locations in the three-dimensional model;

determining three-dimensional geographic coordinates corresponding to the selected location in the three-dimensional model; and encoding the location-based reminder with the three-dimensional geographic coordinates corresponding to the selected location in the three-dimensional model;

wherein the location-based reminder is triggered based at least in part on one or more signals indicative of user position in the geographic area.

19. The one or more tangible, non-transitory computer-readable media of claim 18, wherein the data indicative of the user placement of the reminder comprises data indicative of a user interaction directed to an image captured of the geographic area presented on a display device.

20. The one or more tangible, non-transitory computer-readable media of claim 19, wherein the operation of determining a selected location within a three-dimensional model comprises accessing the three-dimensional model corresponding to the geographic area depicted in the image based at least in part on position and orientation information associated with the image.

\* \* \* \* \*